Feb. 27, 1962 C. KWISNEK 3,022,572
APPLICATOR FOR PLACING A HARNESS ON A LIVE MINNOW
Original Filed Aug. 2, 1957
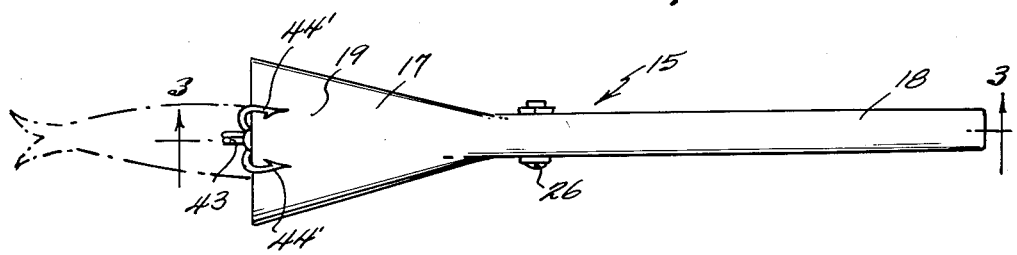
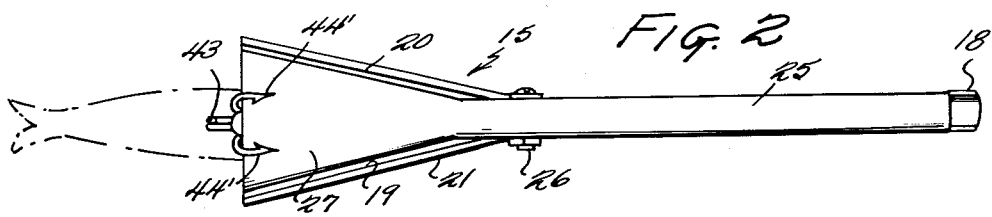
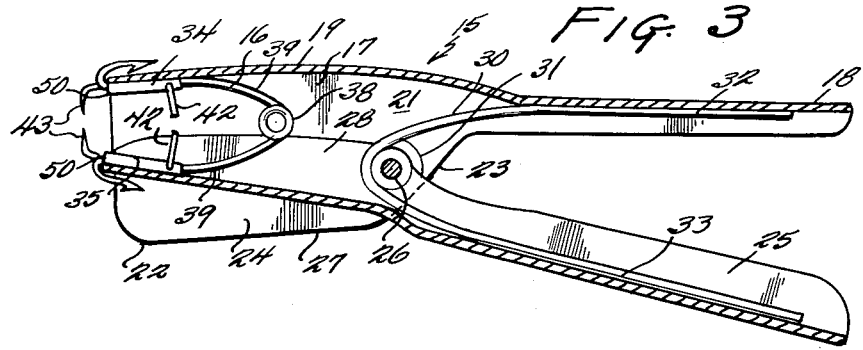
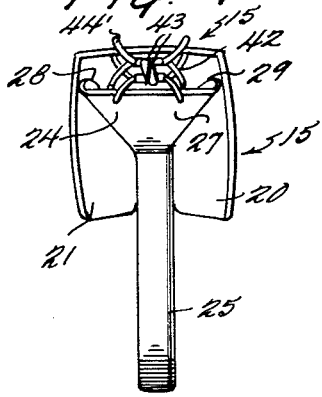
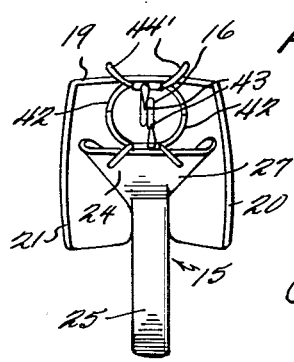
INVENTOR
CHARLES KWISNEK
BY
Kimmel & Crowell
ATTORNEYS 3,022,572
APPLICATOR FOR PLACING A HARNESS
ON A LIVE MINNOW
Charles Kwisnek, R.F.D. 1, Box 157, Blairsville, Pa.
Original application Aug. 2, 1957, Ser. No. 675,926, now Patent No. 2,984,929, dated May 23, 1961. Divided and this application Aug. 30, 1960, Ser. No. 52,917
1 Claim. (Cl. 29—225)

This invention relates to improvements in an applicator for placing a harness on a live minnow and comprises a division of my copending application Serial No. 675,926, filed August 2, 1957, now Patent No. 2,984,929.

An object of the invention is to provide an applicator that will place a harness on a live minnow without damaging the live minnow so that the minnow provided with the harness will furnish an effective fish lure.

Many fishermen use live bait for fishing, but it is difficult to position live minnows in relation to the hooks to provide an efficient lure. Usually the live minnow is killed or so damaged that its usefulness as a fish bait is ended. However, with the use of the present invention the live minnow will not be killed and will, when the harness is positioned thereon, provide an efficient fish lure.

Another object of the invention is to provide an applicator for a harness that will efficiently retain the live minnow in the harness by spring action and an applicator which will overcome the spring action of the harness so that it can be placed on the live minnow.

With the above and other objects and advantages in view, the invention consists of the novel details of construction, arrangement and combination of parts more fully hereinafter described, claimed and illustrated in the accompanying drawings in which:

FIGURE 1 is a top plan view of an applicator for placing a harness on a live minnow;

FIGURE 2 is a bottom plan view of the applicator of FIGURE 1;

FIGURE 3 is a longitudinal sectional view taken substantially on the line 3—3 of FIGURE 1 and viewed in the direction indicated by the arrows;

FIGURE 4 is a front view of the applicator with the harness for a live minnow placed therein and with the harness in collapsed condition;

FIGURE 5 is a view similar to FIGURE 4 with the harness in expanded position to be placed on a live minnow.

Referring now to the drawings in detail, wherein like parts are designated by like reference numerals, the reference numeral 15 is used generally to designate an applicator for applying a harness generally indicated 16 to a live minnow. The applicator 15 comprises a fixed jaw 17 having a rolled handle 18 on one end thereof. The jaw 17 has a substantially triangular shaped top portion 19 with the handle 18 extending from the apex of the top portion 19. Inwardly converging side portions 20 and 21, respectively, are formed integral with the top portion 19 and depend below the place of the top portion 19. The forward corners of the side portions 20 and 21 are rounded as at 22 and the rear edges of side portions 20 and 21 are curved as at 23.

A movable jaw 24 is provided with a rolled handle 25 and the movable jaw 24 is pivotally mounted on the fixed jaw 17 between the side portions 20 and 21 by means of a pivot bolt 26. The movable jaw 24 is provided with a substantially triangular shaped bottom portion 27 which is adapted to fit within the side portions 20 and 21 of the fixed jaw 17. The movable jaw 24 also has side portions 28 and 29 that are formed integral with the side edges of the bottom portion 27 and the side portions 28 and 29 are of considerably less length than the side portions 20 and 21 of the fixed jaw 17. The edges of the side portions 28 and 29 curve rearwardly from the forward edge of the movable jaw 24 as shown in FIGURE 6.

A U-shaped expansion spring 30 is positioned intermediate of the jaws 17 and 24 with coil 31 thereof in circumjacent relation to the pivot bolt 26 and with an end 32 thereof in engagement with the handle 18 and an end 33 thereof in engagement with the handle 25. Since the handles 18 and 25 are of rolled construction, the ends 32 and 33 of the spring 30 will remain within the handles 18 and 25.

The harness 16 which is more fully described in my abovementioned copending application comprises identically shaped body portions 34 and 35, with each body portion 34 and 35 having a neck portion 36. A U-shaped compression spring having a coil 38 has the ends 39 thereof received in sockets in the neck portions 36 of the body portions 34 and 35 to position the body portions in opposed relation to each other.

Apertured bosses are formed on the sides of the body portions 34 and 35 in diametrically opposed relation to each other and an L-shaped gripping spring member 42 is positioned at one end in each of the bosses. The gripping members 42 extend toward the body portions 34 and 35 that they are not attached to so that when a live minnow is not positioned between the body portions 34 and 35 they will be in overlapped relation to each other.

An inwardly directed penetrating prong 43 is mounted in a socket in the curved tail end 50 of each of the body portions 34 and 35. When the harness is in position they will overlap each other as shown, but when the harness is applied to a live minnow, they will penetrate the sides of the live minnow.

A pair of outwardly directed oppositely curved fish hooks 44 are mounted in each of the ends 50 of the body portions 34 and 35 and are positioned on opposite sides of the penetrating prongs 43.

When it is desired to apply the harness 16 to a live minnow, the coiled portion 38 of the harness 16 is inserted between the fixed and movable jaws 17 and 24. The hooks 44 engage the forward edges of the fixed and movable jaws 17 and 24 so that when the handles 18 and 25 are compressed, the body portions 34 and 35 will be moved away from each other.

Thus, a live minnow can now enter harness 16. The applicator is then placed in the water and the shape of the fixed and movable jaws 17 and 24 will attract a live minnow and cause it to hide between the jaws. When the live minnow is in place, the handles 18 and 25 are released and the spring action of the harness 16 will cause it to grip the live minnow. The prongs 43 will enter the live minnow to retain the harness 16 on the live minnow. A very gentle compression of the handles 18 and 25 will now release the live minnow with the harness in place thereon so that it will drop out of the applicator.

The harness 16 is placed on the minnow while it is in the water in the container for the live minnows, thus the minnow never leaves the water, is not exposed to the air and will thus live longer.

The harness 16 may have double hooks, as shown, may have single hooks or may have single hooks and weed guards as desired. If desired, the penetrating prongs may also be eliminated and the harness retained on the live minnow by spring action.

It is believed that from the foregoing description the structure and operation of the invention will be apparent to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

An applicator for applying a harness to a live minnow comprising a fixed jaw and a movable jaw, a pivot bolt connecting said jaws in operational relation to each other, a handle on each of said jaws, and a compression spring positioned between said jaws in circumjacent relation to said pivot bolt, each of said jaws having horizontal portions of substantially triangular formation with the fixed jaw having inwardly converging depending side portions that overlap inwardly converging upstanding side portions on said movable jaw, the forward corners of both the depending and upstanding side portions being rounded, the depending side portions being of substantially greater height than the upstanding side portions and spaced outwardly a substantial distance therefrom.

References Cited in the file of this patent

UNITED STATES PATENTS 2,762,028     Coningh et al.   ---------- Sept. 4, 1956